United States Patent Office 2,989,368
Patented June 20, 1961

2,989,368
CESIUM RECOVERY FROM AQUEOUS SOLUTIONS
Richard A. Schneider, Richland, Wash., assignor to the United States of America as represented by the United States Atomic Energy Commission
No Drawing. Filed Nov. 4, 1957, Ser. No. 694,463
15 Claims. (Cl. 23—25)

This application deals with the separation or recovery of cesium values in pure form from aqueous solutions containing said values together with other cations.

When uranium is bombarded with neutrons of thermal energy, fission products and transuranic elements including plutonium are formed. In processing such neutron-irradiated uranium for the isolation of the plutonium and the uranium, e.g., by extraction or precipitation, aqueous waste solutions are obtained which contain the bulk of the fission products formed during irradiation. One of the fission products present in such aqueous waste solutions is cesium. In a waste solution which had been stored for about six years, for instance, 98 percent of the radioactivity was found to be due to cesium. These waste solutions usually contain comparatively high concentrations of salts the addition of which was necessary for the various processing steps, such as aluminum nitrate, mercury nitrate, and sodium nitrate, and of acids, such as nitric acid, however, they contain the fission product values, including the cesium values, in comparatively very small concentrations. These conditions make a separation of the cesium especially difficult.

One of the predominant cesium isotopes present in the above-described type of waste solution is $Cs^{137}$ which is a $\gamma$- and $\beta$-emitter. $Cs^{137}$ is a source for $\gamma$- and $\beta$-rays of rather constant strength due to its long half-life (37 years). On account of this characteristic, $Cs^{137}$ has been found useful for food and drug sterilization, for the polymerization of hydrocarbons, for the production of mobile high-voltage, low-current sources (atomic batteries), for teletherapy and for radiography.

Precipitation of cesium has been carried out heretofore with nickel, cobalt or ferric ferrocyanide, but these processes have to be carried out from a solution having a low acidity or even from alkaline solutions.

It is an object of this invention to provide a process of precipitating cesium values from aqueous solutions having comparatively high concentrations of a strong mineral acid.

It is another object of this invention to provide a process of recovering cesium values by carrier precipitation from aqueous solutions containing it together with other fission products whereby excellent separation from said other fission products is obtained.

Still another object of this invention is to provide a process of recovering cesium values from aqueous solutions by which separation from sodium cations present in said solutions is obtained.

It is finally also an object of this invention to provide a process of recovering cesium values from aqueous solutions in which more than 99 percent of the cesium present in said aqueous solutions is recovered in one precipitation step.

It has been found that cesium values are practically quantitatively removed from aqueous solutions by incorporating a precipitate of a cobaltous, zinc, cadmium, nickel or ferrous cobalticyanide; these precipitates carry the cesium values.

The precipitation is satisfactory only from mineral acid solutions such as sulfuric, nitric acid and hydrochloric acid solutions; however, it is operative also from alkaline solutions as will be shown later. In the case of nitric acid, for instance, an acidity range of from 1.5 M acid to an acid-deficiency of up to 0.5 M was found to yield the best results; but the acidity may vary widely and may be as high as 5 M. (Acid-deficient solutions are not alkaline solutions. They are solutions in which the excess acid and part of the acidity resulting from hydrolysis of the salts present have been neutralized, for instance, with alkali metal hydroxide. A 0.2 M acid-deficient solution, for instance, is a solution to which alkali metal hydroxide has been added in a quantity sufficient to neutralize all of the excess acid and 0.2 M of the acid derived from hydrolysis of the salt. Acid-deficient solutions are still acid solutions; a 0.2 M acid-deficient nitrate-containing solution, for instance, usually has a pH value of about 1.5 for a solution about 2 M in uranyl nitrate.)

The metal cobalticyanide can be incorporated in the solution as a preformed precipitate or else it may be formed in situ, the latter is preferred. The precipitate is formed in the solution by adding a water-soluble cobalticyanide and a water-soluble metal salt; for instance, potassium or ammonium cobalticyanide and metal nitrate or chloride are suitable.

It was found best to use the metal salt and the soluble cobalticyanide in equimolar quantities and in amounts resulting in a "concentration" of the precipitate in the solution of at least 0.002 M. The concentration range of between 0.002 and 0.005 M gave the best results. A concentration of the precipitate of 0.001 M carried only 55 percent of the cesium values present.

The preferred embodiment of the process of this invention thus comprises adjusting the acidity of an aqueous solution containing a mineral acid salt of cesium to an acid concentration of from 1.5 M acidity to 0.5 M acid-deficiency; incorporating a water-soluble cobalticyanide and a water-soluble metal salt in a quantity to obtain a metal cobalticyanide precipitate corresponding to a concentration in the solution of at least 0.002 M, said metal being selected from the group consisting of cobalt in the divalent state, zinc, cadmium, nickel and iron in the divalent state; and separating the cesium-carrying precipitate from the aqueous solution.

The precipitation can be carried out at room temperature (about 25° C.) or at elevated temperature; a temperature of between 80 and 95° C. was preferred. Agitation, for instance, for about 20 minutes followed by digestion for about one hour has been found advantageous for the completion of the reaction and for better separability of the precipitate. The precipitate can be separated from the solution by any means known to those skilled in the art, for instance, by centrifuging, filtration or decontamination; centrifuging is the preferred method. It is then washed in order to remove any adhering solution and thus to improve separation from fission products; the precipitate is then dried and thereby made ready for immediate use as a $\gamma$-source.

If the supernatant remaining after the cesium has been precipitated is to be discharged into the ground and the cesium has not been removed sufficiently, the precipitation step is repeated. The cesium content usually is brought down to a concentration of 0.02 microcurie per milliliter by a second precipitation step.

In the following a few examples are given to illustrate the process of this invention, but not to limit its scope.

EXAMPLE I

A simulated process waste solution was used containing phosphoric acid anions in a concentration of 0.123 M; ferrocyanide anions in a concentration of 0.0022 M; sulfuric acid anions in a concentration of 0.13 M; sodium cations in a concentration of 3.54 M; nitrate anions in a concentration of 3.1 M; and potassium cations in a concentration of 0.018 M. The solution had a pH value of 9.6. For each test 2 milliliters of this solution were used; and in each instance 200 microliters of $Cs^{137}$ were added thereto; the solutions were then diluted with water to a volume of 10 milliliters. To 3 of these 10-milliliter samples each 850 microliters of a 0.2 M metal salt solution was added, namely, cobalt nitrate solution, zinc nitrate solution and cadmium nitrate solution, respectively. Thereafter concentrated sulfuric acid was admixed to the samples in varying quantities. The solutions were diluted with water to a volume of 24 milliliters and then heated on a water bath to a temperature of between 80 and 90° C. To the hot solutions there was then added in each instance 1 milliliter of a 0.2 M potassium cobalticyanide solution; the mixtures thus obtained were stirred for about 5 seconds and then immediately centrifuged for approximately 10 minutes; the supernatants were poured off and discarded. The precipitates were slurried with 1 N nitric acid to remove any adhering solution; they were then dried at about 110° C. and $\gamma$-counted.

Gamma-counting was carried out with a scintillation counter using a thallium-activated sodium iodide crystal 1¾ inch diameter and ½ inch thick on a 2-inch multiplier phototube. The electric circuit consisted of a high-voltage power supply for the photomultiplier and an amplifier, a discriminator and a scaler. The instrument had an input sensitivity controlled to 0.1 mev. A 1.7-gm./cm.$^2$ lead absorber was placed next to the scintillation crystal to stop $\beta$-particles and greatly to attenuate low energy $\gamma$- and X-rays so that low energy pulses did not overdrive the discriminator. The instrument was calibrated with a $Cs^{137}$ standard of known disintegrations per minute. The counting efficiency for $Cs^{137}$, defined as counts per minute per disintegration per minute, is 3.72 percent.

The results of these experiments are compiled in Table I; they are given in percentages of cesium removed as based on the cesium originally present in the solution.

*Table I*

| Cobalticyanide | Concentration of Sulfuric Acid | | | | | |
|---|---|---|---|---|---|---|
|  | 1 N | 2 N | 3 N | 4 N | 5 N | 6 N |
| Cobaltous | 98.5 | 97.7 | 99.4 | 97.8 | 97.7 | 98.2 |
| Zinc |  |  | 97.6 |  |  |  |
| Cadmium |  |  | 97.1 |  |  |  |

The yields obtained with cobaltous cobalticyanide carried out at various acidities show that in the case of sulfuric acid a concentration of 3 N is best.

The effect of ammonium and potassium cations and nitric acid on the cesium removal from a 3 N sulfuric acid solution is shown in the following example.

EXAMPLE II

For each experiment 2 milliliters of the simulated waste solution used in Example I and having the same content of $Cs^{137}$ were placed in a round-bottom centrifuge cone. To this solution ammonium nitrate and potassium nitrate, respectively, was added in predetermined amounts. Thereafter about 10 milliliters of water, 3.3 milliliters of concentrated sulfuric acid, and 850 microliters of a 0.2 N solution of cobaltous nitrate were consecutively added to each sample, and then the volume of each mixture thus obtained was adjusted to 40 milliliters by the addition of water. With the ammonium nitrate three tests were carried out using different amounts of the nitrate.

A third set of samples was prepared again using the same simulated solution spiked with the same amount of $Cs^{137}$ and incorporating 10 milliliters of water, 3.3 milliliters of concentrated sulfuric acid and 850 milliliters of cobaltous nitrate solution. However, in this instance, instead of ammonium or potassium nitrate, nitric acid was added in various quantities; the volume of each solution was then diluted to yield a volume of 40 milliliters.

All the samples were heated to above 80° C. whereby the salts added dissolved. Then 1 milliliter of a 0.2-M solution of potassium cobalticyanide was added to each sample. The precipitates formed thereby were separated from the supernatant by centrifuging, washed with a 2-N nitric acid and $\gamma$-counted as in Example I. The results are compiled in Table II.

*Table II*

| Substance Added | Percent of Cs Precipitated | | | | |
|---|---|---|---|---|---|
|  | 0.5 M | 1 M | 6 M | 8 M | 10 M |
| $NH_4NO_3$ | 100 | 91.2 |  | 15.8 |  |
| $KNO_3$ |  |  | 96.9 |  |  |
| $HNO_3$ |  | 100 | 54.4 |  | 23.5 |

Table II shows that considerable cesium losses occur at an ammonium ion concentration of 8 M and at nitric acid concentrations of 6 M and above when these were present in a solution containing sulfuric acid in a concentration of 3 N. Similar tests showed that the presence of phosphoric acid anions, ferrocyanide anions, sulfuric acid anions and sodium cations do not interfere with cesium recovery. Nitric acid anions per se also do not have a disadvantageous effect if present in the sulfuric acid solution as a salt of nitric acid or if present in the form of nitric acid, in the latter case provided that the concentration is below 6 M.

EXAMPLE III

Synthetic nitric acid waste solutions were used containing ferric sulfate in a concentration of 0.051 M, sodium sulfate in a concentration of 0.05 M, uranium in a concentration of 0.01 M, cesium$^{137}$ in a concentration of $8.29 \times 10^4$ microcuries per gallon and varying concentrations of nitric acid and sodium nitrate. A number of cobalticyanide precipitations were carried out on aliquots of this solution using different cation salts for the precipitate formation. The results of these tests are compiled in Table III.

*Table III*

| Cation M | $K_3Co(CN)_6$ | $HNO_3$, Acidity | $NaNO_3$, M | $Cs^{137}$ left in soln., µc./gal. | Cs Removal, Percent |
|---|---|---|---|---|---|
| Co$^{++}$ .0025 | .0025 | 5.1 M | 0.37 | $1.02 \times 10^4$ | 87.94 |
| Co$^{++}$ .0025 | .0025 | 3.4 M | 2.07 | $4.52 \times 10^3$ | 94.55 |
| Co$^{++}$ .0025 | .0025 | 1.7 M | 3.77 | $8.2 \times 10^2$ | 99.01 |
| Co$^{++}$ .0025 | .0025 | 0.86 M | 4.63 | $3.42 \times 10^2$ | 99.59 |
| Co$^{++}$ .0025 | .0025 | pH 0.0 | 4.40 | $4.16 \times 10^2$ | 99.50 |
| Co$^{++}$ .0025 | .0025 | pH 4.0 | 4.42 | 97.8 | 99.88 |
| Co$^{++}$ .0025 | .0025 | pH 7.0 | 4.43 | $4.28 \times 10^4$ | 48.37 |
| Co$^{++}$ .0025 | .0025 | pH 8.5 |  | $4.79 \times 10^4$ | 42.22 |
| Co$^{++}$ .0025 | .0025 | pH 10.0 |  | $4.59 \times 10^4$ | 44.63 |
| Cd .0025 | .0025 | 0.86 M | 4.63 | 187 | 99.77 |
| Cu .0025 | .0025 | 0.86 M | 4.63 | $2.56 \times 10^4$ | 69.12 |
| Ag .0025 | .0025 | 0.86 M | 4.63 | $5.13 \times 10^4$ | 38.12 |
| Hg .0025 | .0025 | 0.86 M | 4.63 | $5.61 \times 10^4$ | 32.33 |
| Fe$^{++}$ .0025 | .0025 | 0.86 M | 4.63 | $7.15 \times 10^3$ | 91.34 |
| Ni .0025 | .0025 | 0.86 M | 4.63 | $1.02 \times 10^3$ | 98.77 |
| Zn .005 | .005 | 0.86 M | 4.63 | 0.9 | 99.99 |
| Zn .0025 | .0025 | 0.86 M |  | $8.18 \times 10^1$ | 99.90 |
| Zn .001 | .001 | 0.86 M |  | $3.73 \times 10^4$ | 55.01 |
| Zn .0005 | .0005 | 0.86 M |  | $5.02 \times 10^4$ | 39.45 |
| Zn .0001 | .0001 | 0.86 M |  | $6.74 \times 10^4$ | 18.70 |

The above data show that cobalt, zinc, cadmium, nickel and also iron are suitable for the process of this invention but that copper, silver and mercury cobalticyanides do not carry the cesium well enough to make the process satisfactory. The results also show that cesium precipitation is greatly reduced when carried out from solutions having a pH value of 7 or above. Table III furthermore shows that a concentration of 0.001 M and below for the zinc cobalticyanide does not accomplish quantitative cesium recovery. The sodium nitrate concentration did not seem to have an effect on the carrying of cesium.

EXAMPLE IV

Tests were also carried out with an actual plant waste solution. The solution was acid; cobaltous nitrate was incorporated to yield a concentration of 0.0025 M and then potassium cobalticyanide to yield a concentration of 0.003 M. The cesium was removed to a degree of 98.8 percent.

A similar test was carried out with the same plant waste solution using, instead of the cobaltous nitrate, zinc nitrate in a quantity to yield a concentration of 0.0025 M. In this case cesium removal was 99.1 percent.

In precipitating the cesium by the process of this invention a separation from the bulk of practically all of the fission products is obtained with one exception, namely, ruthenium. Ruthenium is usually carried with the cesium; the precipitates average a ruthenium concentration of from 3 to 9 percent.

If it is desired to have the cesium in very pure form, the fission products or other values that have been carried with the cesium on the cobalticyanide can be removed by dissolving the precipitate in small amounts of boiling sulfuric acid, adding an excess of periodic acid and boiling the solution whereby the ruthenium volatilizes as the tetroxide. The quantity of sulfuric acid used for dissolving the precipitate is advantageously chosen so that the solution obtained has a concentration of from about 5 to 6 M. After the ruthenium has volatilized, the excess periodic acid is decomposed by continuing boiling. Boiling was carried out until the solution was highly concentrated and then water was added twice and the solution was concentrated by boiling each time to remove the iodine formed from the solution.

Further decontamination from fission products other than ruthenium may then be achieved by scavenging the solution with ferric hydroxide. This is accomplished by adding ferric nitrate (e.g. a solution containing 50 g. Fe/l.) and sodium hydroxide (e.g. a 50-percent solution) to the previously concentrated solution. The ferric hydroxide carries (coprecipitates or adsorbs) fission products other than cesium that were originally carried along with the cesium on the cobalticyanide. For instance, small quantities of antimony and cerium that are usually carried to some degree by the cobalticyanide can be removed by scavenging with ferric hydroxide. The ferric hydroxide precipitate is then washed with water or a sodium hydroxide solution, but preferably with water, to remove any cesium solution adhering thereto. These washes are combined with the supernatant of the ferric hydroxide precipitate for cesium recovery.

Another process of treating the cobalticyanide comprises washing it with dilute hydrochloric acid for the removal of any nitrate, calcining in an atmosphere of chlorine at about 350° C. whereby all metal compounds are converted to the chlorides and dissolving of the chlorides obtained in water. Ammonia is then added to the chloride solution until its pH value is about 4 whereby all zirconium present precipitates as the hydroxide. Ruthenium and any cobalt present are then precipitated as the sulfides with hydrogen sulfide, and the sulfides are separated from the solution, e.g. by centrifugation. The solution containing the cesium chloride together with ammonium chloride and hydrochloric acid is then evaporated to dryness and the residue is calcined at 350° C. Anhydrous cesium chloride is obtained thereby.

The cesium can be recovered from the solution by any means known to those skilled in the art; this phase of the process is not part of the invention. If the cesium solution does not have a sufficiently high degree of purity after scavenging, precipitation on cobalticyanide may be repeated for further decontamination. The final cesium solution may be evaporated to dryness; the residue is ready for immediate use as a $\gamma$-source.

It will be understood that this invention is not to be limited to the details given herein, but that it may be modified within the scope of the appended claims.

What is claimed is:

1. A process of separating cesium values from an aqeous mineral acid solution comprising adjusting the acidity to a value within the range from a pH value of about 1.5 to a molarity of about 5, adding a metal-cation-cobalticyanide precipitate in the solution, said metal cation being selected from the group consisting of cobaltous, zinc, cadmium, nickel and ferrous cations whereby the cesium values are carried on the precipitate; and separating the precipitate from the solution.

2. The process of claim 1 wherein the solution to be treated is a nitric acid solution in which the nitric acid is present in a concentration of about 1 M.

3. The process of claim 1 wherein the mineral acid is sulfuric acid and is present in a concentration of about 3 N.

4. The process of claim 1 wherein precipitation is carried out from the solution heated to a temperature of between 80 and 95° C.

5. The process of claim 1 wherein the metal-cation-cobalticyanide precipitate is formed in the solution by adding a soluble salt of an inorganic mineral acid and said cation and a soluble cobalticyanide.

6. The process of claim 5 wherein said soluble salt and the cobalticyanide are added in approximately equimolar quantities and in amounts to yield a precipitate concentration in the solution of at least 0.002 M.

7. The process of claim 6 wherein the precipitate is present in the solution in a concentration of between 0.002 and 0.005 M.

8. A process of separating cesium values from fission product values occurring in uranium after bombardment with neutrons of thermal energy including ruthenium values all contained in an aqueous mineral acid solution, comprising adjusting the acidity to a concentration within the range of from a pH value of about 1.5 to a molarity of about 5 and the temperature to between 80 and 95° C.; adding about equimolar quantities of a soluble inorganic mineral acid salt of a metal selected from the group consisting of cobalt (II), zinc, cadmium, nickel and iron (II) and potassium cobalticyanide in quantities so as to yield a metal cobalticyanide precipitate in the solution corresponding to a concentration of from 0.002 to 0.005 M; separating the precipitate from the solution; dissolving the precipitate in boiling sulfuric acid so as to yield a concentration of between 5 and 6 M; adding periodic acid to the sulfuric acid solution formed; heating the sulfuric acid solution to boiling whereby the ruthenium values volatilize; adding a ferric hydroxide precipitate whereby part of the fission product values are carried on the ferric hydroxide while the cesium values remain in solution; and separating the cesium values-containing solution from the ferric hydroxide precipitate.

9. The process of claim 8 wherein the metal cation is cobaltous cation.

10. The process of claim 8 wherein the metal cation is zinc.

11. The process of claim 8 wherein the metal cation is cadium.

12. The process of claim 8 wherein the metal cation is nickel.

13. The process of claim 8 wherein the metal cation is ferrous cation.

14. The process of claim 8 wherein the soluble inorganic mineral acid salt is a nitrate.

15. The process of claim 8 wherein the soluble inorganic mineral acid salt is a chloride.

References Cited in the file of this patent

UNITED STATES PATENTS

| | | |
|---|---|---|
| 2,769,780 | Clifford et al. | Nov. 6, 1956 |
| 2,892,680 | Burgus | June 30, 1959 |

OTHER REFERENCES

Sidgwick, N.V.: "The Chemical Elements and Their Compounds," vol. 2, Oxford Univ. Press, London, 1950, page 1397.

Leny: "Rare Earths," Longmans, Green and Co., N.Y., 2nd Ed., 1924, pages 120, 121.

Yamagata in "Chemical Abstracts," vol. 52, col. 6995.

Langford: A.E.C. Research and Dev. Report HW-49668, April 15, 1957.

Harmon: A.E.C. Research and Dev. Report HW. 49544A, April 3, 1957.